United States Patent
Valenti et al.

(10) Patent No.: US 9,397,603 B2
(45) Date of Patent: Jul. 19, 2016

(54) MULTIPLE FIELD MOTOR CONTROLLER

(71) Applicant: V Square/R LLC, East Greenwich, RI (US)

(72) Inventors: Leo F. Valenti, East Greenwich, RI (US); James C. Daly, Ave Maria, FL (US); Thomas J. Valenti, North Kingstown, RI (US)

(73) Assignee: V Square/R LLC, East Greenwich, RI (US)

(*) Notice: Subject to any disclaimer, the term of this patent is extended or adjusted under 35 U.S.C. 154(b) by 377 days.

(21) Appl. No.: 14/210,773

(22) Filed: Mar. 14, 2014

(65) Prior Publication Data

US 2014/0368093 A1    Dec. 18, 2014

Related U.S. Application Data

(60) Provisional application No. 61/834,221, filed on Jun. 12, 2013, provisional application No. 61/912,016, filed on Dec. 5, 2013.

(51) Int. Cl.
| | | |
|---|---|---|
| *H02K 33/12* | (2006.01) | |
| *H02P 1/00* | (2006.01) | |
| *H02P 3/00* | (2006.01) | |
| *H02P 5/00* | (2016.01) | |
| *H02P 25/18* | (2006.01) | |

(52) U.S. Cl.
CPC .................................... H02P 25/18 (2013.01)

(58) Field of Classification Search
CPC ........................................... H02P 25/18
USPC ....................................... 318/126
See application file for complete search history.

(56) References Cited

U.S. PATENT DOCUMENTS

| 4,806,838 | A | 2/1989 | Weber | |
|---|---|---|---|---|
| 5,077,512 | A | 12/1991 | Weber | |
| 5,883,488 | A | 3/1999 | Woodward | |
| 5,969,497 | A | 10/1999 | McDonald et al. | |
| 6,242,884 | B1 | 6/2001 | Lipo et al. | |
| 6,329,783 | B1* | 12/2001 | Vrionis | H02P 25/04 318/772 |
| 6,346,790 | B1* | 2/2002 | Kemp | H02P 25/04 318/729 |
| 6,639,338 | B1 | 10/2003 | Haner | |
| 6,756,756 | B1* | 6/2004 | Chmiel | H02P 1/42 318/430 |
| 2003/0038609 | A1 | 2/2003 | Shien | |
| 2011/0001450 | A1* | 1/2011 | Hancock | H02P 1/44 318/785 |
| 2012/0007570 | A1 | 1/2012 | Valenti et al. | |
| 2015/0376829 | A1* | 12/2015 | Peterson | H02P 1/44 34/282 |

* cited by examiner

*Primary Examiner* — Erick Glass
(74) *Attorney, Agent, or Firm* — McDonnell Boehnen Hulbert & Berghoff LLP (57) ABSTRACT

An electric motor including a first conductive winding, a second conductive winding, a rotor, and a controller is disclosed. When energized by an AC source, the first conductive winding generates a first magnetic field. The second conductive winding, which is configured to be selectively energized by the AC source via one or more switches, is arranged so as to generate a second magnetic field superimposed with the first magnetic field when so energized. The rotor magnetically interacts with the first magnetic field, or the superimposed first magnetic field and second magnetic field, such that a torque is applied on the rotor. The controller is configured to: (i) obtain a measurement of a voltage of the AC source; (ii) make a determination, based on the measurement, whether to energize the second conductive winding; and (iii) energize the second conductive winding in accordance with the determination.

20 Claims, 6 Drawing Sheets

MULTIPLE FIELD MOTOR CONTROLLER

CROSS-REFERENCE TO RELATED APPLICATIONS

This application claims priority to, and the benefit of, U.S. Provisional Patent Application No. 61/834,221, filed Jun. 12, 2013, and U.S. Provisional Patent Application No. 61/912,016, filed Dec. 5, 2013, the contents of which are hereby incorporated herein by reference in their entireties.

FIELD

The present disclosure relates generally to inductive motors, and more particularly to systems and methods of regulating power consumed by, and output from, electric motors so as to conserve energy.

BACKGROUND

Unless otherwise indicated herein, the materials described in this section are not prior art to the claims in this application and are not admitted to be prior art by inclusion in this section.

An inductive motor converts electrical energy to mechanical energy via electromagnetic interactions that create torque on a shaft. An AC motor may include a stator in which a magnetically polarized rotor rotates. The stator can include a structure on which a conductive winding is wound in a configuration such that a rotating magnetic field is created within the stator when AC current flows through the winding. The rotor may include one or more permanent magnets or may be configured to become magnetized via inductive interaction with the stator's magnetic field (e.g., via conductive coils and/or ferromagnetic materials in the rotor). When an AC source is applied to the winding, the stator's magnetic field can cause the rotor to rotate relative to the stator. The rotor can be coupled to a shaft, which transfers the torque applied to the rotor, and the mechanical energy can then be used to perform work on a load. The rate at which work can be performed using the motor (i.e., the output power of the motor) is related to the torque magnetically applied to the rotor. The torque is proportionate to the strength of the magnetic field imparted on the rotor by the stator's winding. And the strength of the magnetic field is proportionate to the current through the winding, and the number of turns in the winding. The number of turns in the winding is a feature of the winding's geometry, and the current depends on the resistivity of the wire used and also the voltage of the AC source.

Typical AC inductive motors used in compressors, fans, and a variety of other household appliances and electronics are designed to operate under maximum anticipated load conditions, and to do so even when supplied with less than a nominally expected AC driving voltage. Providing for a tolerance in the AC driving voltage helps ensure reliable operation of the motor when supplied with a line voltage that is less from the nominally expected value. For example, a motor may be designed to drive a maximum anticipated load when supplied with a line voltage of about 105 VAC, rather than 120 VAC.

To provide such a tolerance in AC driving voltage, a motor designer first determines the magnetic field strength necessary to provide a target output power level. The motor designer then selects a stator with a conductive winding that will conduct a sufficient amount of current to provide the necessary magnetic field strength. As noted above, the magnetic field strength is proportionate to the current through the stator's winding, which is itself proportionate to the AC driving voltage. Thus, to account for the voltage tolerance, the conductive winding is formed of wire with a resistivity sufficient to conduct a desired amount of current (sufficient to provide the necessary magnetic field strength) while driven with the reduced AC voltage rather than the nominally expected voltage. As such, a typical motor's windings are over-sized for operation at the nominal AC voltage, and generally conduct more current than actually necessary, which wastes energy. For example, the stator winding may use a lower gauge wire than necessary to generate the desired magnetic field strength when supplied with the nominally expected AC driving voltage.

The efficiency of an AC motor can be expressed by a ratio of the electrical power consumed (e.g., the product of voltage and current supplied to the motor from the AC source) and the actual power delivered to a load to perform work. The ratio of consumed power to volt-amperes of delivered power is referred to as a motor power factor. For typical motors, the power factor varies depending on the power consumed, but also varies depending on the load being driven. In most cases, a motor operates with its greatest power factor when under maximum loaded conditions, because a relatively small fraction of the consumed power is dissipated as eddy currents or resistive heating. By contrast, when the motor is not under maximum load, the motor consumes relatively more excess energy. The excess energy is dissipated as heat (e.g., due to eddy currents in the stator structure or resistive heating in the coils). Essentially, when a motor is only partially loaded, the excess energy that is not used to perform work is simply wasted.

For example, a typical motor rated for ⅓ horsepower may draw about 5 amperes from a 120 VAC source when fully loaded and operate around 3,500 revolutions per minute (RPM) with about 70-80% power factor or better. Yet, even under virtually no load, the same motor may continue to draw about 3.8 amperes, although with a reduced power factor of about 20-30%. It is under the unloaded condition (or under a state of reduced load) where considerable excess electric power is wasted because of the decreased efficiency of the motor under such conditions. To a large extent, the decreased efficiency is caused by the eddy-current and resistive losses noted above.

One way to decrease the amount of power dissipated in the motor is to decrease the amount of power supplied to the motor from the AC source. A reduced AC voltage drives a reduced current through the stator coils, which reduces resistive losses in the coils themselves and also provides a reduction of the magnetic field strength in the stator which results in less eddy-current loss as well. Reducing the supplied AC voltage can cause an unloaded (or partially loaded) motor to draw less current, which reduces the electrical energy consumed, and thereby increases the efficiency of the motor. However, regulating an AC voltage provided to a motor typically involves switching losses and is energy inefficient itself.

SUMMARY

An electric motor includes a first conductive winding, a second conductive winding, a rotor, and a controller. When energized by an AC source, the first conductive winding generates a first magnetic field. The second conductive winding, which is configured to be selectively energized by the AC source via one or more switches, is arranged so as to generate a second magnetic field superimposed with the first magnetic field when so energized. The rotor magnetically interacts with the first magnetic field, or the superimposed first magnetic field and second magnetic field, such that a torque is applied on the rotor. The controller can operate to selectively energize the second winding, which adjusts the total current drawn by the combination of windings, and thereby adjusts the strength of the total magnetic field that interacts with the rotor. The controller can be configured to: (i) obtain a measurement of a voltage of the AC source; (ii) make a determination, based on the measurement, whether to energize the second conductive winding; and (iii) energize the second conductive winding in accordance with the determination. As such, the controller can selectively energize the second winding so as to adjust the output power of the motor and thereby compensate for variations in the AC supply voltage.

Some embodiments of the present disclosure provide an electric motor. The motor can include a first conductive winding, a second conductive winding, a rotor, and a controller. The first conductive winding can be coupled to an AC source, and can be configured to generate a first magnetic field in response to being energized by the AC source. The second conductive winding can be configured to be selectively energized by the AC source via one or more switches. The second conductive winding can be arranged so as to generate a second magnetic field superimposed with the first magnetic field in response to being energized by the AC source. The rotor can be configured to magnetically interact with the first magnetic field, or the superimposed first magnetic field and second magnetic field, such that a torque is applied on the rotor. The controller can be configured to: (i) obtain a measurement of a voltage of the AC source; (ii) make a determination, based on the obtained measurement, whether to energize the second conductive winding; and (iii) if the determination is made to energize the second conductive winding, cause the one or more switches to operate such that the second conductive winding is coupled to the AC source, or rather, if the determination is made to not energize the second conductive winding, cause the one or more switches to operate such that the second conductive winding is not coupled to the AC source.

Some embodiments of the present disclosure provide a method of operating an electric motor. The electric motor can have a first conductive winding configured to generate a first magnetic field in response to being energized by an AC source, a second conductive winding configured to generate a second magnetic field superimposed with the first magnetic field in response to being energized by the AC source, and a rotor configured to magnetically interact with the first magnetic field, or the superimposed first magnetic field and second magnetic field, such that a torque is applied on the rotor. The method can include obtaining a measurement of a voltage of the AC source. The method can include making a determination, based on the obtained measurement, whether to energize the second conductive winding. If the determination is made to energize the second conductive winding, the method can include causing one or more switches to couple the second winding to the AC source. If, rather, the determination is made to not energize the second conductive winding, the method can include causing the one or more switches to not couple the second conductive winding to the AC source.

Some embodiments of the present disclosure provide a non-transitory computer readable medium storing instructions that, when executed by one or more processors in a computing device, cause the computing device to perform operations. The operations can include obtaining a measurement of a voltage of an AC source. The operations can include making a determination, based on the obtained measurement, whether to energize a conductive winding. If the determination is made to energize the conductive winding, the operations can include causing one or more switches to couple the second winding to the AC source. If, rather, the determination is made to not energize the second conductive winding, the operations can include causing the one or more switches to not couple the second conductive winding to the AC source These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An electric motor includes a primary winding and a supplemental winding, arranged such that, while current flows through the windings, each induces a respective magnetic field that applies torque on a rotor. The resulting fields are superimposed with one another and combine to apply torque to the rotor via magnetic interaction. The primary winding can be connected to an AC source that energizes the primary winding. The supplemental winding can be connected to the AC source through a switch (or perhaps multiple switches) to allow the supplemental winding to be selectively energized. The output power of the motor is measured by the rate at which the rotor performs work on a load driven by the rotor. The output power of the motor is therefore related to the strength of the torque applied to the rotor. The torque is related to the strength of the magnetic field provided by the combination of windings. And the strength of the magnetic field is related to the total current through the combination of windings. Selectively energizing the supplemental winding can thus adjusting the total current conveyed through the combination of windings and thereby regulate the output power of the motor.

A controller operates the switch connecting the supplemental winding to the AC source, and thereby regulates the current through the supplemental winding (and the output power of the motor). The controller receives real time measurements from various inputs indicating the voltage of the AC source, and/or other factors, such as the degree of loading of the motor. Based on these real time measurements, the controller can make a determination whether to energize the supplemental winding such that the motor operates at a target output power level. And the controller can then generate a control signal to the switch that causes the supplemental winding to be energized, or not energized, in accordance with the determination. In addition, because the power consumed by the motor is related to the total current drawn from the AC source, the multiple winding motor consumes less power when the supplemental winding is not energized. By selectively energizing the supplemental winding only when additional magnetic field strength is required to provide a target output power level, the power consumed from the AC source can be reduced without sacrificing operating performance of the motor.

To provide different output power levels (and power consumption levels), the windings can have different constructions and/or layouts within the stator. The windings can be formed from wires with different gauges (e.g., resistivity) and can be wound in different geometric arrangements (e.g., numbers of turns). The strength of the magnetic field contributed from each winding proportionate to the product of the number of turns in the winding and the current through the winding. The product can be referred to as the winding's ampere-turns. So, to provide different magnetic field strengths, the two windings may have a similar number of turns, but with the primary winding using a lower resistivity wire (e.g., lower gauge) than the supplemental winding. The ampere-turns of the primary winding is greater than the ampere-turns of the supplemental winding when both windings are energized by a given AC source, and so the primary winding generates a magnetic field with greater strength than the supplemental winding. Of course, many other combinations of different winding geometries and wire gauges may be realized such that the two windings generate magnetic fields with different relative strengths and thereby provide different relative contributions to the output power of the motor. In some examples, the number of turns in all windings can be equal such that the transformer effect between the different windings is approximately equal and prevents different voltages from developing across different windings.

The relative strengths of the magnetic field from each winding may be selected in a number of different ways. For example, the primary winding can be configured such that, when energized by an AC source having a nominal voltage, it generates sufficient magnetic field strength to operate the motor at a target output power level. However, the voltage of the AC source may be less than the nominal voltage in some cases, such as due to transmission losses, transformer losses, and/or other systemic/transient factors involved in distributing AC power via an electricity grid. At a decreased voltage, the magnetic field strength (and output power) is also decreased, because the current through the primary winding is proportionate to the voltage of the AC source. The supplemental winding can be configured such that, when energized by an AC source having a minimum voltage, it generates sufficient additional magnetic field strength (that combines with the primary winding's reduced magnetic field) to operate the motor at the target output power level. Such a dual winding motor thus has two modes of operation: reduced voltage, in which both windings are energized and provide a combined magnetic field that interacts with the rotor; and full voltage, in which only the primary winding is energized and provides a magnetic field that interacts with the rotor.

In another example, the relative strengths of the magnetic field from each winding may be selected to be equal to one another, or at least nearly so. For example, both the primary winding and the supplemental winding may have similar winding geometries (e.g., the same number of turns) and use a wire with a similar resistivity (e.g., the same gauge wire). As a result, the magnetic field strength contributed by the primary winding can be equal to the magnetic field strength contributed by the supplemental winding (or at least approximately equal subject to materials variations, etc.). Such a dual winding motor, with equal-strength windings thus has two modes of instantaneous operation: full strength, in which both windings are energized, and half-strength, in which only one of the two equal windings are energized. Moreover, one or more additional windings may be included, in which case the relative field strengths of the different windings can be equally divided amongst all such windings. For example, a motor with three total windings (e.g., one primary and two supplemental) can be configured such that each winding contributes about 33.3% of the total field strength, and a motor with four total windings can be configured such that each winding contributes about 2.5% of the total field strength.

During operation, the controller can compensate in real time for variations in the voltage of the AC source so as to maintain a target output power level from the motor. For example, when the AC voltage exceeds a threshold, the controller may energize only the primary winding, because the current conveyed through the primary winding by the threshold-exceeding AC voltage provides sufficient magnetic field strength to operate the motor at the target level. And when the AC voltage is below the threshold, the controller can decide to also energize the supplemental winding, because the reduced AC voltage conveys relatively less current through the primary winding, which provides a corresponding reduced magnetic field strength. Energizing the supplemental winding can compensate for the current reduction, and the motor can thereby maintain its target output power level even as the AC source voltage varies.

Moreover, the controller may also determine whether to energize the supplemental winding based partially on the loading condition of the motor, which may vary over time as well. For instance, the controller may receive an indication of the real time loading on the motor, and determine whether to energize the supplemental winding based on that indication. The controller can thus energize the supplemental winding only to the extent required to drive the load (i.e., perform work on the load). For example, the controller may receive an indication from a torque sensor that indicates the amount of torque applied on the rotor.

In another example, the controller may monitor actually current drawn by the primary winding, and use that current as an indicator of the loading. Some motors inductively draw increased current to the stator winding as the loading increases (e.g., by increasing the motor slip). Thus, regardless of the AC voltage, upon the current through the primary winding exceeding a threshold value, the controller may energize the supplemental winding to allow current to flow through both windings, which maintains the output power (and perhaps allows it to increase) and also decreases the current through the primary winding. By limiting the current through the primary winding, the controller can help prevent damage to the windings associated with excess current, such as thermal breakdown, etc. In addition, by energizing the supplemental winding only when determined to be necessary, and otherwise energizing only the primary winding, the motor also conserves energy and operates with a higher power factor.

The controller can also mitigate distortion of the AC source waveform, and associated radio frequency interference (RFI), by turning the switch on and off as the AC current crosses through zero. At zero current, the energy stored in the supplemental inductive winding is zero, and so the supplemental winding can be connected to the AC source (or disconnected from the AC source) without rapidly discharging energy to or from the supplemental winding. Such rapid discharge events may occur, for example, upon connecting the inductive winding during a portion of the AC waveform that is not a current zero-crossing. The rapid discharge causes a spike in current drawn from the AC source (and voltage inductively generated across the winding), which both distorts the AC waveform and generates RFI. For a periodically varying AC waveform, such as a sinusoidal waveform, the current crosses through zero twice each full cycle of the waveform (one positive-to-negative zero-crossing, and another negative-to-positive zero-crossing). And so the motor can react to real time measurements on time scales on the order of a cycle or half-cycle of the AC waveform frequency (e.g., for a 60 Hz sinusoidal AC driving voltage, every $1/120$ seconds).

The switch that energizes the supplemental winding is regulated by the controller as described above. The controller can include a voltage sensor, a current zero-crossing detector, and a logic module. The controller can be connected across the AC source, to facilitate measurement of the AC voltage detection of current zero-crossings, and also to provide power to the logic module (e.g., via a rectifier that supplies DC power to the logic elements). The controller also includes an interface that generates command signals to cause the switch to open and close. The switch may be a semi-conductive device, such as a thyristor, or perhaps a transistor (e.g., a GANFET), which switches between a conductive state and a non-conductive state based on an applied voltage. The controller functions to determine whether to energize the supplemental winding based on a voltage measurement of the AC source, and perhaps also based on other factors. The controller also generates a command signal to cause the switch to open/close coincident with current zero-crossings.

The logic module functions to make determinations in real time, whether to energize the supplemental winding based on a voltage measurement of the AC source, and then causes the switch to operate in accordance with the determination. For example, the logic module may receive an indication of a voltage measurement, and then map the voltage measurement to a particular configuration of the switch suitable to provide a target output power from the motor. The logic module may be implemented as a processor executing program instructions. Although the logic module may be implemented by various combinations of software-implemented and/or hardware-implemented functional modules, including counters, comparators, logical gates, etc.

Some motors may also adjust the magnetic field strength contributed by the supplemental winding (and thus the output power of the motor) by energizing the supplemental winding non-continuously. The supplemental winding may be energized in proportion to the magnetic field strength sought, relative to the winding's magnetic field strength when energized continuously. In operation, the supplemental winding can be energized with a desired duty cycle by repeatedly disconnecting the supplemental winding from the AC source (during a current zero crossing in the AC waveform), and then reconnecting the supplemental winding to the AC source (also during a current zero crossing in the AC waveform). The duty cycle refers to the ratio of time, over some period, during which the supplemental winding is energized. The duty cycle may be defined by the number of half-cycles of the AC waveform in one second during which the supplemental winding is energized divided by the number of half-cycles in one second.

To provide a target output power level from the motor, the duty cycle of the supplemental winding can be selected to generate a target contribution to the magnetic field strength. That is, the duty cycle may be set in accordance with a ratio of the desired average magnetic field strength contribution from the supplemental winding, as compared to the magnetic field strength of such winding when continuously energized. For example, a supplemental winding that contributes about 20% of the total magnetic field strength can be energized with a 50% duty cycle, and the average power output from the supplemental winding can thus be approximately 10%. In combination with a primary winding that contributes about 80% of the total magnetic field strength, a 50% duty cycle on the supplemental winding causes the motor to operate at about 90% output power (for a given AC driving voltage).

Some motors may include a supplemental winding that is configured to be connected alternately with reverse polarity so as to generate a magnetic field that opposes the magnetic field of the primary winding. The total magnetic field strength that acts on the rotor (from the superimposed fields) can then be less than the magnetic field of the primary winding alone. As such, the supplemental winding may be used to either enhance the output power of the motor, by contributing a magnetic field that is additive to the primary winding's magnetic field, or decrease the output power of the motor, by contributing a magnetic field that opposes the primary winding's magnetic field. For example, a primary winding that nominally contributes about 80% of the total magnetic field strength can be complemented by a 20% supplemental winding that can either add to, or oppose, the primary winding's field. By energizing the supplemental winding with different duty cycles and with different polarities, the output power of such a motor can be adjusted between 60% and 100% of the total output power (for a given AC source voltage).

Some motors may include more than one supplemental winding. For example, a motor may include three supplemental windings (or more), and the windings can each be configured to provide a different relative contribution to the total magnetic field strength (e.g., through selection of wire gauges for each winding, etc.). In other examples, each of the windings (e.g., the primary and any number of supplemental windings) can be configured to provide equal contributions to the total magnetic field strength. Thus, in an example with four total windings, each can contribute about 25% of the total field strength. The amount of total output power of the motor, which is related to magnetic field strength, can thus be divided between contributions from a single primary winding, and multiple supplemental windings in a number of different ways.

In some examples, the primary winding and each of the supplemental windings have the same number of turns. Providing an equal number of turns mitigates voltage variations across different windings due to inductive coupling between the windings (e.g., the transformer effect). The inductive (or magnetic) coupling is directly proportional to the number of turns, and so setting all supplemental windings to have the same number of turns insures that the voltage across the coil is identical.

The windings can then be energized in different combinations and/or with different duty cycles to provide different output power levels. By selectively energizing different combinations of the primary and supplemental winding(s), the total magnetic field strength (for a given AC driving voltage) can be scaled from a minimum power level (e.g., when energizing only the primary winding) to 100% power level (e.g., when energizing all windings simultaneously). Of course, other combinations of windings with other values are also possible, including combinations with more than three supplemental windings or less than three supplemental windings.

II. Example Multiple Field Electric Motor

Figure 1:
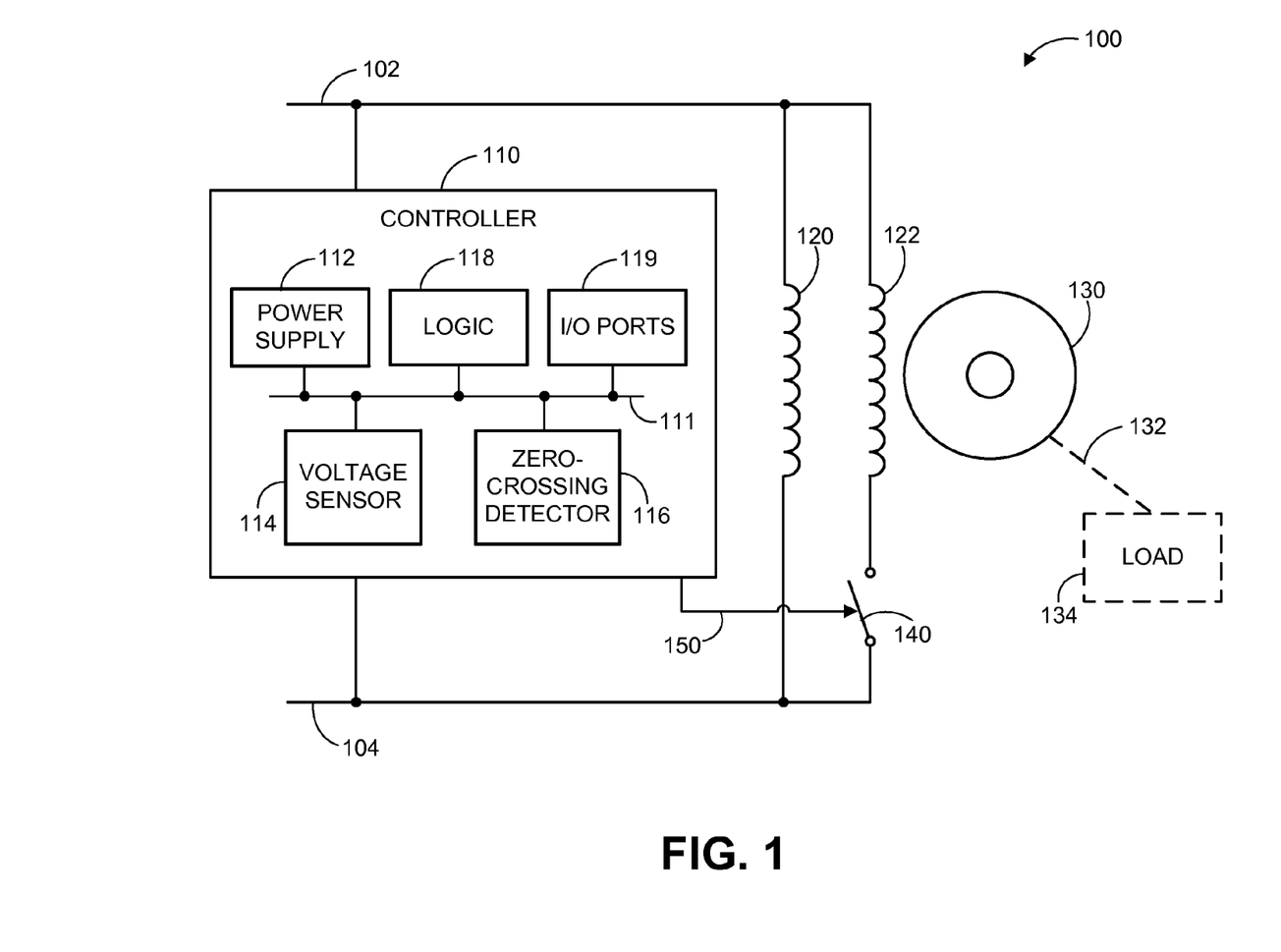
FIG. 1 is a diagram of an example electric motor with a primary winding and a selectively energized supplemental winding.

FIG. 1 is a diagram of an example electric motor 100 with a primary winding 120 and a supplemental winding 122. When current flows through one or both of the two windings 120, 122 a magnetic field is generated that causes a rotor 130 to rotate via a magnetic interaction that applies torque on the rotor 130. The rotor 130 transfers rotational energy to perform work on a load 134 through a mechanical coupling 132 (e.g., a shaft, a belt, gears, etc.). The motor 100 also includes a controller 110 that operates a switch 140 to selectively energize the supplemental winding 122 and thereby regulate the strength of the magnetic field, and the output power of the motor 100.

The power lines 102, 104 supply power to the motor 100 from an electricity mains line. The power line 102 may carry a voltage that varies periodically with respect to the voltage of power line 104. The periodically varying voltage may be an AC voltage distributed by electricity distribution systems. For example, have a sinusoidal waveform with a voltage of about 120 VAC and a frequency of about 60 Hz, as employed on the United States electricity grid. Although alternative sinusoidal waveforms may be used, such as a voltage of about 230 VAC and a frequency of about 50 Hz, as employed on the European electricity grid.

2a) Windings

The AC power lines 102, 104 provide power to energize the primary winding 120. Current flows through the primary winding 120, which generates a magnetic field that interacts with the rotor 130 to cause the rotor 130 to rotate. For example, while energized, the primary winding 120 may generate a rotating magnetic field. To facilitate interaction with the generated magnetic field, the rotor 130 may then include a permanent magnet or a conductive coil that inductively interacts with the primary winding's time-changing magnetic field. While the particular arrangement selected may take variety of different forms, as appreciated by motor designers, the magnetic features of the rotor 130 and the primary winding 120 are arranged such that the magnetic field generated by the energized primary winding 120 applies a torque on the rotor 130.

The supplemental winding 122 is also arranged to apply torque on the rotor 130 via magnetic interaction. The supplemental winding 122 coupled across the AC power Fines 102, 104 via switch 140, which operates in accordance with a control signal 150 from the controller 110. As a result, the strength of the magnetic field applied to the rotor 130, and thus the output power of the motor 100, can be adjusted depending on whether the primary winding 120 is energized by itself or in combination with the supplemental winding 122.

The windings 120, 122 can be configured to generate magnetic fields with different strengths by selection of suitable wire gauge, etc. For example, the primary winding 120 may include about 80% of the total cumulative ampere-turns of the two windings 120, 122 and the supplemental winding 122 may include about 20%. As a result, for a given AC driving voltage, the magnetic field strength contributed from the primary winding 120 can be sufficient to operate at about 80% of the possible output power level, and the supplemental winding 122 can contribute the remaining 20%. Of course, a variety of other arrangements can be employed such that energizing the two windings 120, 12.2 provides different contributions to the output power of the motor 100.

2b) Controller

The controller 110 functions to dynamically adjust the current conveyed to the supplemental winding 122 based on real time voltage measurements of the AC source. The controller 110 may, for example, obtain a measurement of the AC source voltage, determine whether it is necessary to energize the supplemental winding 122 to provide a target output power level from the motor 100, and then generate a suitable control signal 150 to operate the switch 140 in accordance with the determination.

The controller 110 may be implemented with a variety of different technologies to perform the functions described herein. FIG. 1 depicts a particular implementation, in which the controller 110 includes a power supply module 112, a voltage sensor 114, a zero-crossing detector 116, a logic module 118, and an interface port 119, all of which may be communicatively linked to each other via a system bus, network, or other connection mechanism 111. The controller 110 is also electrically coupled to the power lines 102, 104, to facilitate voltage measurements (via voltage sensor 114), AC waveform zero-crossing detections (via zero-crossing detector 116), and also to provide power to the controller (via power supply 112).

The power supply module 112 can include a voltage rectifier and/or voltage regulator that draws power from the AC power lines 102, 104 and generates a rectified DC voltage to power the remaining components of the controller 110. The power supply module 112 may thus supply a DC voltage to the voltage sensor 114, the zero-crossing detector 116, the logic module 118, and/or the interface port 119.

The voltage sensor 114 functions to obtain an indication of the voltage across the AC power lines 102, 104. The voltage sensor 114 may be implemented in accordance with a variety of technologies. In some cases, the voltage sensor 114 may operate as a peak voltage detector, or as a root mean square (RMS) voltage sensor. In one example, the voltage sensor 114 may include a circuit with one or more operational amplifiers or the like that sample the voltage between the lines, 102, 104 in combination with an analog-to-digital converter that generates a digital representation of the measured voltage. A series of such measurements can then be communicated to other components of the controller 110, such as the logic module 118.

The zero-crossing detector 116 functions to estimate the timing at which the current of the AC waveform crosses through zero. The zero-crossing detector 116 may be implemented in accordance with a variety of technologies. The zero-crossing detector 116 may include a current sensor, such as a transimpedance amplifier, a hall effect sensor, etc., in combination with an analog-to-digital converter that generates a digital representation of the measured current. A series of such measurements can then be communicated to other components of the controller 110, such as the logic module 118.

The zero-crossing detector 116 may also detect zero-crossings using a series of logical gates that transition between low and high outputs as the waveform transitions between positive and negative current, the gates can be combined to output a series of voltage pulses that are each substantially coincident with a current zero-crossing of the AC waveform.

As noted below, the controller 110 can then use the timing of the AC waveform current zero-crossings, as indicated by the zero-crossing detector 116, to time the operation of the switch 140. In practice, the controller 110 can function such that the switch opens or closes substantially coincident with a current zero-crossing of the AC waveform. As such, the supplemental winding 122 can be energized (e.g., upon closing the switch 140) or can stop being energized (e.g., upon opening the switch 140) while the current through the current through the supplemental winding 122 is zero (and the current through the AC power lines 102, 104 is also zero). At zero current, the magnetic field of the supplemental winding 122 is zero, which means the supplemental winding 122 also has zero stored energy. By connecting (and disconnecting) the supplemental winding 122 to (and from) the AC power lines 102, 104 while the supplemental winding 122 has zero stored energy, the motor 100 avoids rapid discharges of energy to or from the supplemental winding.

By contrast, connecting the supplemental winding 122 while the AC power lines 102, 104 conduct a non-zero current, or disconnecting the supplemental winding 122 while its current is non-zero, would lead to an immediate spike in current to rapidly source or sink current as necessary to bring the supplemental winding current into agreement with the AC waveform 102, 104. Among other factors, such current spikes generate radio frequency interference (RFI), and other forms of electromagnetic interference (EMI), which can interfere with other electronics components. The current spikes resulting from non-zero current switching can also lead to harmonic noise on the mains lines 102, 104 due to voltage across the supplemental winding 122 created by the rapid current change, which is then applied to the AC power lines 102, 104. The current spikes can also mitigate performance of the motor 100, because the supplemental winding's magnetic field strength contribution is proportionate to the current through the supplemental winding, and so a current spike rapidly increases or decreases the magnetic field strength of the supplemental winding relative to the primary winding, and may even temporarily unbalance or otherwise destabilize the motor 100.

The logic module 118 may be implemented in accordance with a variety of technologies. The logic module 118 can include a processor executing program instructions to perform the functions described herein. Such a processor may be a general purpose or special purpose processor implemented according to a variety of different technologies. And such program instructions may be stored, for example, on a non-transitory computer readable medium included in the controller 110 or otherwise associated with the controller 110. Additionally or alternatively, the logic module 118 may include a combination of logic gates and other components such as counters, comparators, inverters, and the like incorporated in a field programmable gate array, an application specific integrated circuit, or the like.

Regardless of implementation, the logic module 118 functions to cause the controller 110 to provide the control signal 150 to the switch 140 such that the switch 140 operates in a manner that causes the motor 100 to provide a target output power level. In practice, the logic module 118 receives indications of measurements obtained with the voltage sensor 114 and zero-crossing detector 116. The logic module 118 then determines whether to energize the supplemental winding 122 based in part on the obtained voltage measurement. The logic module 118 may, for instance, determine a total amount of ampere-turns needed to generate a magnetic field with sufficient strength to provide the target output power level via magnetic interaction with the rotor 130. The logic module 118 may then determine, based on the measured voltage of the AC power lines 102, 104, the amount of ampere-turns that will be provided by the primary winding 120. The logic module 118 may then whether the additional ampere-turns of the supplemental winding 122 are necessary to achieve the determined total amount of ampere-turns. The logic module 118 can then determine to energize the supplemental winding (or not) based on the determination of whether the supplemental winding's ampere-turns are (or are not) necessary to achieve the target output power level. And the logic module 118 then causes the interface port to provide the provide the corresponding control signal 150 to either open or close the switch 140 at the next current zero-crossing of the AC waveform (as indicated by the zero-crossing detector 116). So, at least in some embodiments, the logic module 118 may operate such that whether to open or close the switch 140 is based at least in part on a measurement from the voltage sensor 114, and the timing at which the switch 140 is caused to open or close is based at least in part on a measurement from the zero-crossing detector 116.

The interface port 119 functions to output the control signal 150 that operates the switch 140. The interface port 119 may be implemented in accordance with a variety of technologies. The control signal 150 may be a logical high voltage or a logical low voltage, such as in implementations in which the switch 140 is s semiconductive device. And the interface port 119 may set the control signal 150 in accordance with the determination made by the logic module 118 to either open the switch 140, or close the switch 140.

In addition, the logic module 118 may also determine to energize the supplemental winding 122 upon the current drawn by the primary winding 120 exceeding a threshold. As the driven load 134 increases, the rotor 130 tends to slip more relative to the generated magnetic field, which induces additional current to the primary winding 120. In such an arrangement, the current drawn by the prix vary winding 120 increases as the load 134 increases, which increases may be due to a variety of transient factors. Without intervening, and without regard to the AC voltage on the power lines 102, 104, the motor 100 would "overload" and the primary winding 120 would burn-out or otherwise undergo deleterious thermal effects associated with drawing a greater current than intended given the resistivity of the wire in the primary winding 120. Thus, the logic module 118 may function to monitor the current drawn by the primary winding 120, and selectively energize the supplemental winding 122 upon the current through the primary winding 120 exceeding a threshold value that corresponds to the resistivity of the primary winding 120.

The controller 110 can thus dynamically adjust the switch 140 to maintain a target output power level based on real time measurements of the AC voltage and/or the current drawn by the primary winding 120. The controller 110 may operate by making a series of real time determinations of whether or not to energize the supplemental winding 122, for a given combination of measured AC voltage, target output power level, and perhaps current drawn by the primary winding 120. However the controller 110 may also operate by energizing the supplemental winding 122 with a particular duty cycle that is selected to achieve, on average, a target output power level of the motor 100. The controller 110 may therefore determine the desired time-average contribution from the supplemental winding 122 that provides a corresponding desired average contribution to the output power of the motor. And then the controller 110 can cause the switch 140 to energize the supplemental winding 122 with a duty cycle that provides the desired time-average contribution. The controller 110 can therefore repeatedly disconnect and then reconnect the supplemental winding 122 to the AC power lines 102, 104, such that the ratio of time in which the supplemental winding 122 is connected agrees with the target duty cycle. As such, the output power contributed by the supplemental winding 122 can be scaled in accordance with the duty cycle that the supplemental winding 122 is energized. Such an operation scheme therefore allows for more precise control over the time-average power level (and by extension, the power consumption) in comparison to a strictly dual mode approach of either fully energizing the supplemental winding 122 or fully not energizing the supplemental winding 122.

While not shown in FIG. 1, the motor 100 may also include an additional starting winding that provides a phase-delayed magnetic field, which combines with the primary winding 120 to initiate rotation of the rotor 130. Such a starting winding may be phase delayed by a reactance different from the primary winding 120, for example. In some cases, the starting winding may be automatically turn off once the rotor 130 achieves a predetermined rotation speed, which may be facilitated by a centrifugal switch or the like. The motor 100 may also include a main power switch that turns the motor on and allows power to flow from the AC supply lines 102, 104 to the windings 120, 122 and controller 110. Of course, many other variations and deviations for the various components disclosed in connection with FIG. 1 are also possible without departing from the scope of the present disclosure, as will be appreciated by a skilled artisan.

III. Multiple Selectively Energized Windings

While FIG. 1 illustrates an example motor with a single supplemental winding, the present disclosure also includes motors with multiple supplemental windings. The supplemental windings can each contribute to the magnetic field that interact with the rotor and thereby contribute to the output power of the motor. Each of the supplemental winding may be separately energized by a respective switch regulated by a controller, and the controller can there by adjust the power output of the motor to achieve a target output power level. Moreover, each of the supplemental windings can generate a respective magnetic field with a different relative strength, which allows for a variety of different combinations of the windings to provide different output power levels. In practice, the controller in such a multiple supplemental winding motor can obtain real time AC voltage measurements and/or current readings, and then determine a particular combination of windings to energize so as to provide a target output power level from the motor. The controller can then cause the respective switches to energize (or not energize) the different supplement windings in accordance with the determined combination, and time the operation of the switches to be substantially coincident with a current zero-crossing of the AC waveform.

3a) Winding Combinations to Adjust Power Delivery

Figure 2:
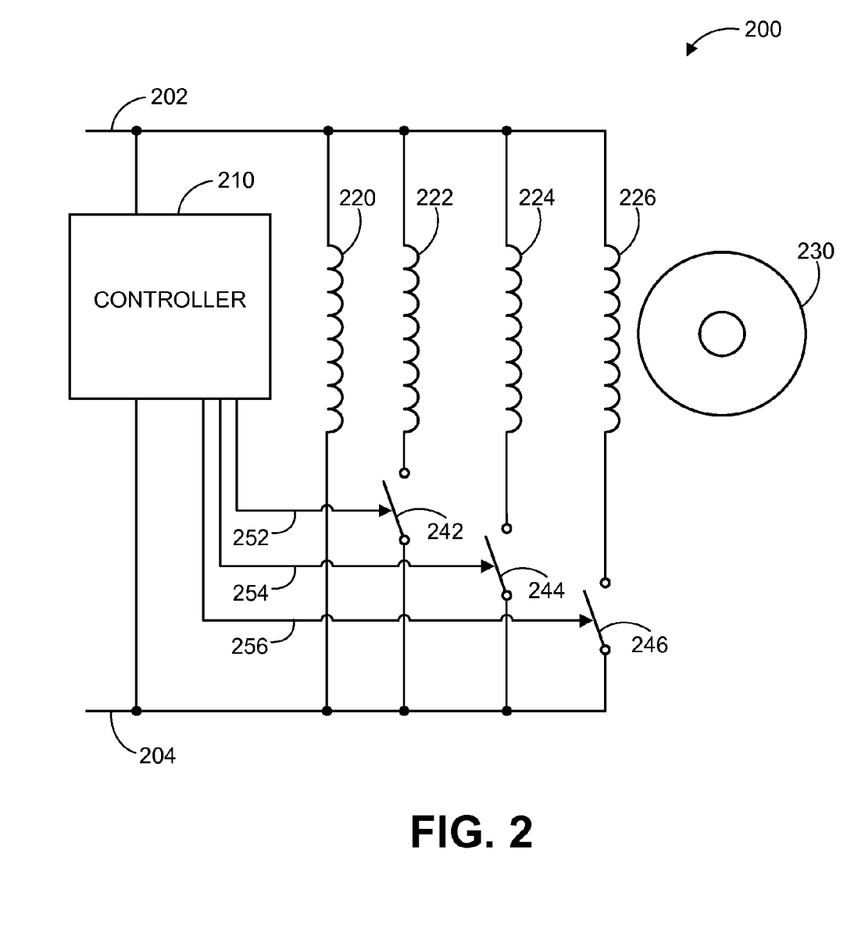
FIG. 2 is a diagram of another example electric motor with multiple supplemental windings.

FIG. 2 is a diagram of another example electric motor 200 with multiple supplemental windings 222, 224, 226. The motor 200 includes a rotor 230 that magnetically interacts with magnetic fields from the supplemental windings 222, 224, 226 and also from a primary winding 220. Power is supplied to the motor 200 from AC power lines 202, 204, and a controller 210 selectively energizes the supplemental windings 222, 224, 226 through respective switches 242, 244, 246 via respective control signals 252, 254, 256. It is noted that while the motor 200 is not identical to the motor 100 described in connection with FIG. 1, many components may be the same or similar. To assist in making comparisons between the drawings, while also recognizing that each example motor presented herein also may have unique characteristics, the various components with general similarities between the different drawings presented herein are numbered by elements incremented by one-hundred for reference.

When current flows through any of the windings 220, 222, 224, 226, a magnetic field is generated that interacts with the rotor 230. The total magnetic field acting on the rotor 230 at any given instant is therefore given by superimposing the magnetic fields from each of the windings that are actually energized at that instant. Each of the windings provide a distinct contribution to the total output power of the motor 200, and also consume a distinct amount of power from the AC lines 202, 204. The power output of the motor 200 (and the power consumed) can therefore be adjusted by selecting different combinations of the windings to energize.

The controller 210 can function similarly to the controller 110 described in connection with FIG. 1 in many respects, but instead of deciding whether to energize a single supplemental winding, the controller 210 determines whether to energize each of the supplemental windings 222, 224, 226. In practice, the controller 210 obtains real time measurements of the AC voltage on the power lines 202, 204, and determines a combination of the supplemental windings 222, 224, 226 to energize to achieve a particular target output power level. In some cases, the target output power level may itself be informed by a real time indication of the load actually being driven by the motor 200 (e.g., the current drawn by the primary winding 220, the rotation speed of the rotor 230, or another indication of motor loading). Once the controller 210 determines a combination of the supplemental windings 222, 224, 226 to energize, the controller 210 then causes the switches 242, 244, 246 to open or close coincident with the next current zero-crossing of the AC waveform by providing suitable control signals 252, 254, 256 to the switches 242, 244, 246.

The switches 242, 244, 246 used to selectively energize the supplemental windings 222, 224, 226 can each be similar to the switch 140 described in connection with FIG. 1. For example the switches 242, 244, 246 may each be a thyristor or a transistor, or another device that switches between a conductive state and a non-conductive state depending on a control signal. In addition, any of the switches 242, 244, 246 may function to energize their respective associated windings 222, 224, 226 in accordance with a selected duty cycle so as to provide an average contribution to the magnetic field that scales with the duty cycle selected. Thus, the controller 210 may cause one or more of the windings 222, 224, 226 to repeatedly disconnect and reconnect to the AC power lines 202, 204, and each connection and disconnection may occur coincident with a current zero crossing of the AC waveform so as to mitigate RFI, EMI, instabilities in the output power, and harmonic reflections into the AC power lines 202, 204

In some cases, the magnetic field strength of the primary winding 220 (e.g., the ampere-turns) may be selected to be sufficient to drive an expected load while the AC power lines 202, 204 supply a nominally expected voltage, such as about 120 VAC. At such voltages, the controller 210 may therefore not energize any of the supplemental windings 222, 224, 226 and the motor 200 may operate solely using the primary winding 220. But in real world conditions, the AC driving voltage may be lower due to various factors associated with distributing power, and so the ampere-turns of the primary winding 220 when driven at such reduced voltage may be insufficient to drive the expected load. Therefore, in response to measuring a reduced AC voltage, the controller 210 can determine a particular combination of the supplemental windings 222, 224, 226 that can allow the motor 200 to continue to drive the expected load, and then energize the determined combination via the switches 242, 244, 246.

The contributions to the motor's output power from each of the supplemental windings 222, 224, 226 can be selected in a variety of different ways. To allow for arranging the different windings in different arrangements that provide different output power levels (and correspondingly different power consumption levels), the different windings can be selected to span a range of different contributions to the output power. In other words, each of the supplemental windings 222, 224, 226 can be configured to provide a different contribution to the magnetic field strength. The different windings may each have a respective wire resistivity such that each has a respective amount of ampere-turns when energized. One example arrangement for the relative strengths of each winding is provided in Table 1, in which the relative ampere-turns of each winding is expressed as a proportion of the total cumulative ampere-turns of the entire motor stator assembly. In another example, each of the supplemental windings 222, 224, 226 (and also the primary winding 220) can have relative strengths that are approximately equal. For example, each winding can individually generate a magnetic field that is 25% of the total magnetic field strength generated when all four are simultaneously energized.

TABLE 1

Example Distribution of Relative Winding Strengths

| Winding | Output Power (Ampere-turns) |
| --- | --- |
| Primary | 65% |
| Supplemental 1 | 20% |
| Supplemental 2 | 10% |
| Supplemental 3 | 5% |

In the distribution of winding strengths provided in Table 1, the total output power of the motor (for a given AC driving voltage) can be incremented from 65% to 100% by energizing different combinations of the supplemental windings, and by continuously energizing the primary winding. For example, 75% output power can be achieved by energizing supplemental winding 2 (e.g., the winding 224), and not energizing supplemental windings 1 or 3 (e.g., the windings 222, 226). In another example, 90% output power can be achieved by energizing supplemental windings 1 and 3, and not energizing supplemental winding 2. Other combinations of relative winding strengths are also possible, as will be appreciated. Some examples provide for distributing the relative strengths of the supplemental windings such that each supplemental winding contributes double the ampere-turns of another supplemental winding, except for the weakest supplemental winding, which then defines the step size between different resulting output power levels.

Further still, a separate duty cycle switch may be inserted between power line 204, and each of the supplemental winding switches 242, 244, 246. The separate duty cycle switch may be opened and closed repeatedly to achieve a desired duty cycle of a given combination supplemental windings 222, 224, 226, which combination is set by the switches 242, 244, 246. In such an arrangement, the primary winding 220 can be continuously energized. The controller 210 can then function to select (based on real time measurements) a particular combination of the supplemental windings 222, 224, 226 to energize, and a duty cycle at which to energize that combination. The controller 210 can then generate suitable control signals to the various switches 242, 244, 246 and the separate duty cycle switch to cause the various windings to be energized in accordance with the determined configuration.

3b) Reverse Connected Windings to Oppose Primary Field

Figure 3:
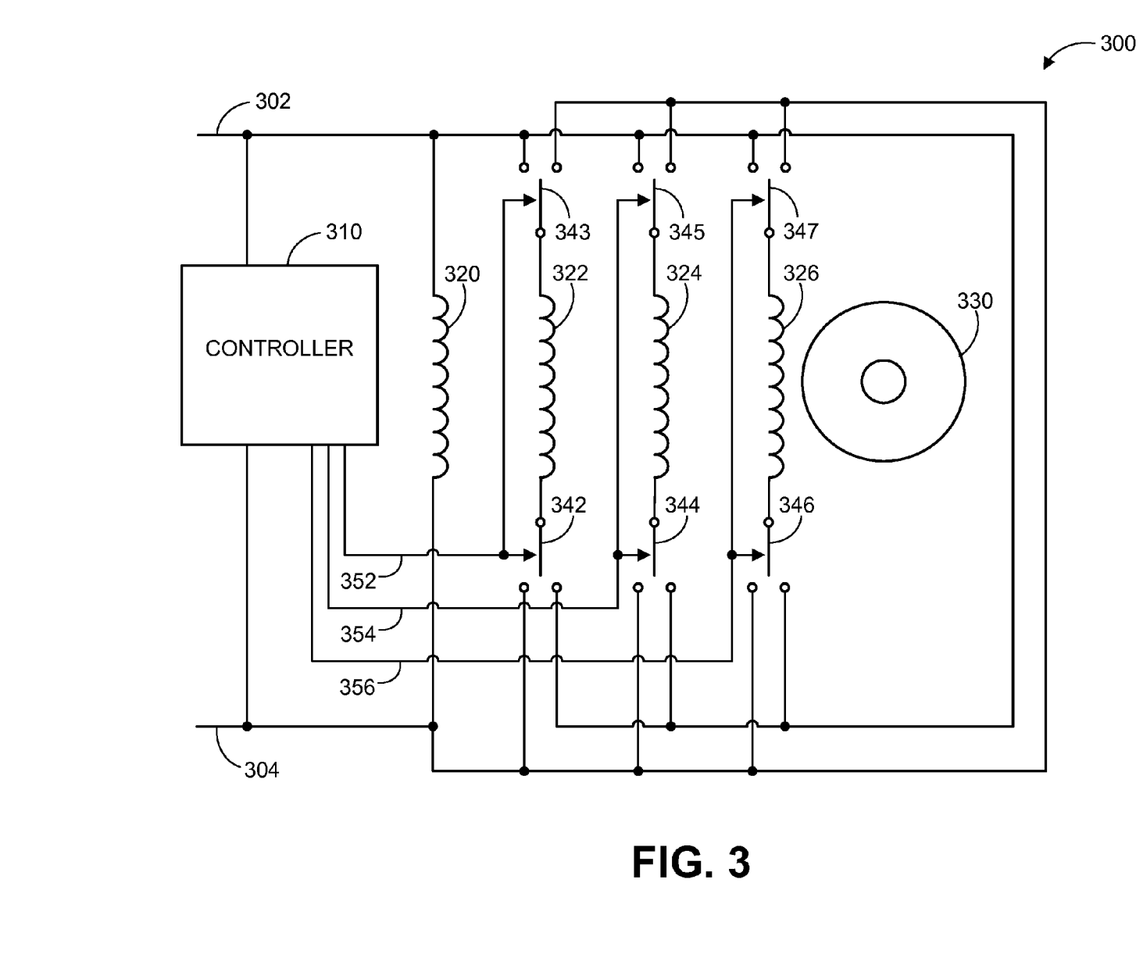
FIG. 3 is a diagram of another example electric motor with multiple supplemental windings that can be connected to oppose the primary winding.

FIG. 3 is a diagram of another example electric motor 300 with multiple supplemental windings 322, 324, 326 that can be connected to oppose the primary winding 320. The motor 300 includes a rotor 330 that magnetically interacts with magnetic fields from the supplemental windings 322, 324, 326 and also from a primary winding 320. Power is supplied to the motor 300 from AC power lines 302, 304, and a controller 310 selectively energizes the supplemental windings 322, 324, 326 through respective switches 342-347 via respective control signals 352, 354, 356. It is noted that while the motor 300 is not identical to the motors 100 and 200 described in connection with FIGS. 1 and 2, many components may be the same or similar. To assist in making comparisons between the drawings, while also recognizing that each example motor presented herein also may have unique characteristics, the various components with general similarities between the different drawings presented herein are numbered by elements incremented by one-hundred for reference.

The switches 342-347 function to selectively energize the supplemental windings 322, 324, 326 via the power lines 302, 304. However, unlike the motors 100, 200 described above, the switches 342-347 function as two-pole switches and can connect the supplemental windings 342, 344, 346 in forward polarity or in reverse polarity. In a forward polarity configuration, the magnetic field generated by a given supplemental winding can be oriented in common with the magnetic field generated by the primary winding 320, similar to the supplemental windings described above that contribute cooperatively to the total magnetic field strength applied to the rotor 330. But in a reverse polarity configuration, the magnetic field generated by a given supplemental winding can be oriented to oppose the magnetic field generated by the primary winding 320, such that the total magnetic field applied to the rotor 330 is weaker than the field generated solely by the primary winding 320. By opposing the field of the primary winding 320, the reverse-connected supplemental windings can thereby lower the output power of the motor 300 (i.e., the amount of torque applied by the rotor 330). The motor 300 can therefore provide sensitive precision control on the output power level, such as demanded by torque-sensitive applications, and can maintain a particular power level even as the supplied AC driving voltage changes (e.g., due to various transient effects).

For example, referring to the first supplemental winding 322, in a forward polarity configuration, the switch 342 can couple a first end of the winding 342 to the AC power line 304; and the switch 343 can couple the second end of the winding 342 to the power line 302. But, in reverse polarity configuration, the switch 342 can couple the first end of the winding 342 to the AC power line 302; and the switch 343 can couple the second end of the winding 342 to the power line 304. The other supplemental windings 324, 326 can similarly be connected in forward or reverse configurations with their respective switches 344, 345 and 346, 347. The control signals 352, 354, 356 provided to the pairs of switches 342-347 by the controller 310 cause the switches to bring about one of three states for each of the corresponding supplemental windings 322, 324, 326: energized in forward polarity, energized in reverse polarity, or not energized.

The controller 310 can function similarly to the controllers 110 and 210 described in connection with FIGS. 1 and 2 in many respects, but in addition to deciding whether to energize ones of the windings 342, 344, 346, the controller 310 also decides whether to energize one or more of those windings with reverse polarity. In practice, the controller 310 obtains real time measurements of the AC voltage on the power lines 302, 304, and determines a combination of the supplemental windings 322, 324, 326 to energize, and polarities with which to energize those windings, so as to achieve a particular target output power level. In some cases, the target output power level may itself be informed by a real time indication of the load actually being driven by the motor 300 (e.g., the current drawn by the primary winding 320, the rotation speed of the rotor 330, or another indication of motor loading). Once the controller 310 determines a combination of the supplemental windings 322, 324, 326 to energize, and the polarities of those connections, the controller 310 then causes the switches 342-347 to operate as necessary to open or close coincident with the next current zero-crossing of the AC waveform by providing suitable control signals 352, 354, 356 to the switches 342-347.

IV. Regulation of AC Applied to Supplemental Winding

Figure 4:
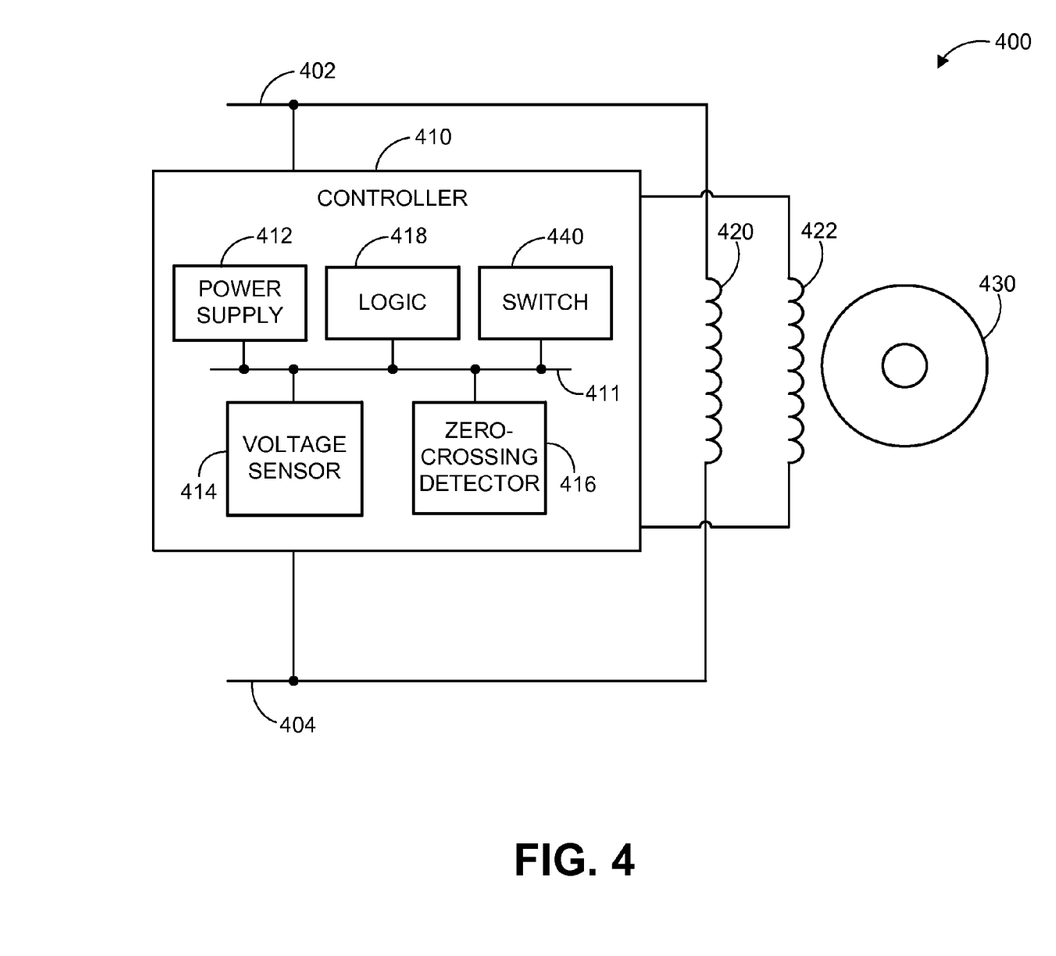
FIG. 4 is a diagram of another example electric motor in which a controller modulates the AC waveform that energizes the supplemental winding.

FIG. 4 is a diagram of another example electric motor 400 in which a controller 410 modulates the AC waveform that energizes the supplemental winding 422. The motor 400 includes a rotor 430 that magnetically interacts with magnetic fields generated by the supplemental windings 422 and also from the primary winding 420, which can be the same or similar to the supplemental and primary windings 122, 120 described above in connection with FIG. 1. Power is supplied to the motor 400 from AC power lines 402, 404, which energize the primary winding 420. A controller 410 is also connected to the AC power lines 402, 404, and applies a regulated AC waveform to the supplemental winding 422 to provide a corresponding regulated contribution to the magnetic field strength that acts on the rotor 430. It is noted that while the motor 400 is not identical to the motors described in connection with FIGS. 1-3, many components may be the same or similar, and features described in connection with those motors may be incorporated into the motor 400.

The controller 410 obtains real time measurements of the AC voltage on the power lines 402, 404, and determines whether or not to energize the supplemental winding 422 with a regulated AC waveform. The controller 410 can then generate the desired regulated AC waveform by repeatedly disconnecting and reconnecting to the AC lines 402, 404 coincident with current zero-crossings, and apply the generated AC waveform to the supplemental winding 422. The controller 410 can be implemented in accordance with a variety of different technologies and may include a power supply 412, a voltage sensor 414, a zero-crossing detector 416, a logic module, and a switch 440, all communicatively connected by a bus, network, or other connection mechanism 411.

Similar to the controller 110 described above, the power supply 412 can rectify power from the AC lines 402, 404 to power the remaining components, the voltage sensor 414 can obtain measurements of the AC voltage on the power lines 402, 404, and the zero-crossing detector can estimate the timing of zero crossings in the AC waveform. And the switch 440 can function analogously to the switch 140 by selectively coupling the supplemental winding 422 to the AC power lines 402, 404. The switch 440 operates in accordance to instructions from the logic module 418 to open and close at current zero-crossings of the AC waveform and thereby mitigate RFI, EMI, and other effects described above.

The logic module 418 can process information from the voltage sensor 414 and zero-crossing detector 416 to dynamically regulate the AC voltage applied to the supplemental waveform 422 via the switch 440. The logic module 418 may, for example, determine a particular time-averaged magnetic strength contribution desired from the supplemental winding 422 so as to maintain a target power level given a particular AC voltage (from the voltage sensor 414). The logic module 418 can then generate a regulated AC voltage to apply to the supplemental winding 422 by repeatedly opening and closing the switch 440 such that the supplemental winding 422 is energized with a duty cycle corresponding to the determined magnetic strength contribution. The regulated AC voltage that energizes the supplemental winding 422 may be generated by selectively connecting to the AC power lines 402, 404 in increments of half-cycles of the AC waveform, such that the ratio between the number of connected half cycles to the number of total cycles during a given period is approximately the desired duty cycle. In some cases, the controller 418 may function similarly to the various control modules and controllers described in U.S. Patent Application Publication No. 2012/0007570, published Jan. 12, 2012, and issued as U.S. Pat. No. 8,193,787, on Jun. 5, 2012, the entire contents of which is hereby incorporated herein by reference in its entirety and for all purposes.

V. Torque Feedback

Figure 5:
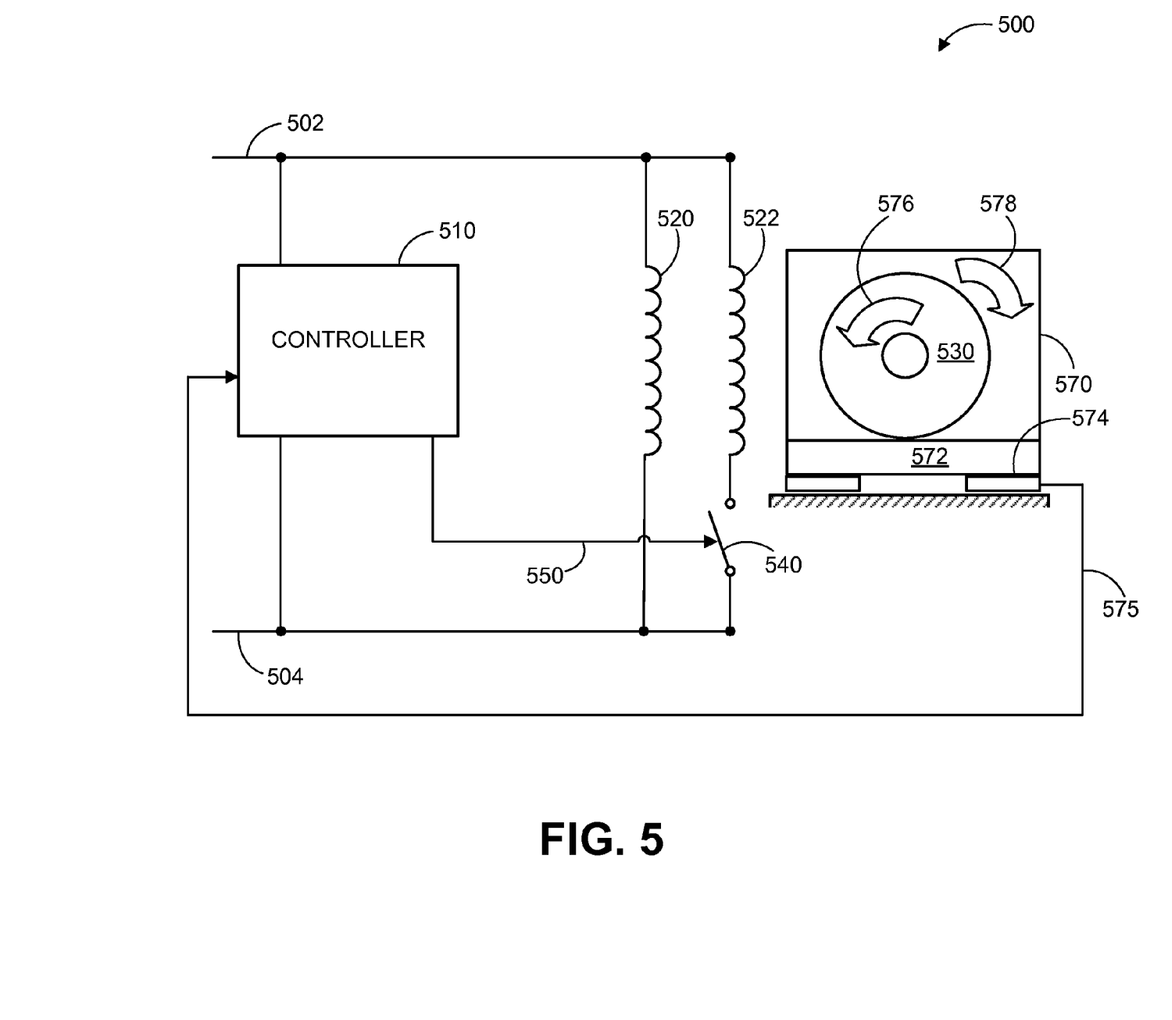
FIG. 5 is a diagram of another example electric motor that receives feedback from a torque sensor.

FIG. 5 is a diagram of another example electric motor 500 that receives feedback from a torque sensor 574. The motor 500 includes a rotor 530 that magnetically interacts with magnetic fields generated by the supplemental windings 522 and also from the primary winding 520, which can be the same or similar to the supplemental and primary windings 122, 120 described above in connection with FIG. 1. Power is supplied to the motor 500 from AC power lines 502, 504, and a controller 510 selectively energizes the supplemental winding 522 through switch 540 via control signal 550. The controller 510, switch 540, and control signal 550 can thus function similarly in many respects to the controller 110, switch 140, and control signal 150 described above in connection with FIG. 1.

However, as shown in FIG. 5, the rotor 530 is situated within a housing 570 (e.g., a stator assembly) resting on a stable platform. The housing 570 includes a base 572 that is attached to the stable platform by multiple mounting points. One of the mounting points may be a pressure-sensitive torque sensor 574. Upon rotation of the rotor 530 during operation of the motor 500, which rotation is indicated by the directional arrow 576, the stator housing 570 experiences an opposite rotational force (indicated by directional arrow 578) that is exerted onto the stable platform via the base 572 and mounting points. The mounting point that includes the pressure-sensitive sensor 574 can be located off-axis from the rotor 530, such that the torque applied on the stator housing 570 is exerted on the sensor 574 with a component normal to the stable platform. The force measured by the sensor 574 is therefore an indication of the amount of torque supplied by the rotor 530, and therefore an indication of the amount of the load being driven by the motor 500. The sensor 574 can output a signal 575 indicative of the measured force, which signal is then received by the controller 510.

The controller 510 can therefore use the torque measurement (from the pressure-sensitive sensor 574) to determine a target output power level at which to drive the motor 500. And the controller 510 can then operate similarly to the other controllers described herein to decide whether to energize the supplemental winding 522 based on a real time measurement of the AC driving voltage, such that the motor 500 provides the target output power level indicated by the torque sensor 575.

Moreover, the motor 500 can further be configured to energize the supplemental winding 522 with a particular duty cycle as described in various embodiments above. Additionally or alternatively, the motor 500 can include multiple supplemental windings, similar to the motor 200 described in connection with FIG. 2. Additionally or alternatively, the motor 500 may be configured to connect one or more supplemental windings with reverse polarity similar to the motor 300 described in connection with FIG. 3, and thereby tune the output power level to match the torque-indicative measurement from the sensor 574, even at output power levels below that supplied by the primary winding 520 alone. Additionally or alternatively, the motor 500 may include a controller similar to the controller 410 described in connection with FIG. 4 that provides a regulated voltage to the supplemental winding to achieve a desired output power level.

VI. Example Operations

Figure 6:
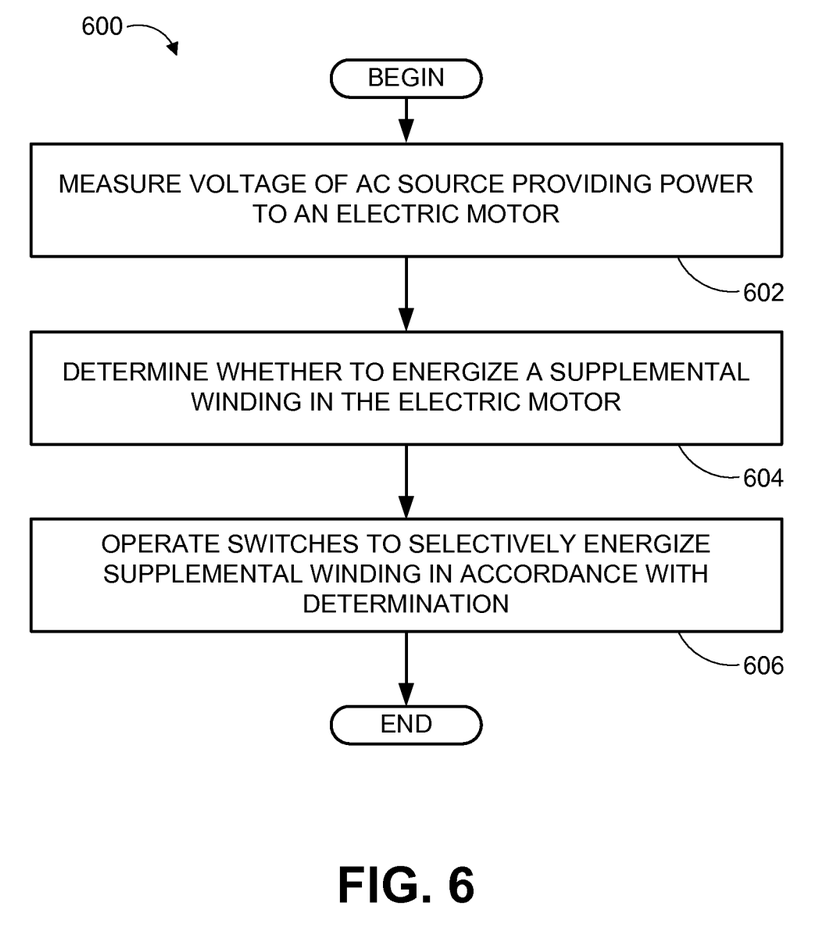
FIG. 6 is a flowchart of an example process for operating an electric motor with multiple windings.

FIG. 6 is a flowchart of an example process 600 for operating an electric motor with multiple windings. The process 600 is described in connection with the motor 100 of FIG. 1 for example purposes, although it is recognized that the process 600 may be performed using any of the motors described herein, including variations of those motors and/or motors that combine one or more features described separately in connection with the various motors.

At block 600, a controller measures the AC voltage of the power lines providing power to the motor. For example, the controller 110 may obtain a voltage measurement from the power lines 102, 104 using its integrated voltage sensor 114. The voltage measurement can be an average voltage measurements, such as a root mean square voltage measurement. The obtained voltage measurement may also include a series of discrete voltage measurements sampled at different times that can be combined to define the AC waveform on the power lines.

At block 604, the controller determines whether to energize a supplemental winding in the electric motor. For example, the controller 110 may determine whether to energize the supplemental winding 122 using its integrated logic module 118. The controller can make the determination based on a variety of factors, including the measured AC voltage obtained in block 602, a target output power level to provide from the motor, an indication of real time motor loading conditions, and/or other factors. For example, the controller may include a look-up table or similar data structure that maps the obtained AC voltage measurement (and perhaps target output power) to a particular duty cycle at which to energize the supplemental winding, and the controller can then select a time-series of connection/disconnection events that cause the supplemental winding to be energized in accordance with the duty cycle. The controller can then determine to energize the supplemental winding in accordance with the selected time-series.

In some examples, the controller may determine, a cumulative number of ampere-turns necessary to provide a target output power level, and then determine how many ampere-turns are provided by the primary winding given the obtained AC voltage measurement. The controller can then determine a combination of supplemental winding(s) to energize to provide the additional ampere-turns (if necessary). The controller can then determine whether to energize the supplemental winding in accordance with the determined combination.

Of course, other examples of the controller determining whether to energize the supplemental winding based, at least in part, on a real time measurement of the AC voltage are also possible, some of which are also described in connection with FIGS. 1-5 above.

At block 606, the controller can generate suitable control signals to operate switches that then energize the supplemental winding in accordance with the determination. For example, the controller 110 may output the control signal 150 to the switch 140. Upon receiving the control signal 150, if the determination made in block 604 is to energize the supplemental winding 122, the switch 140 closes to thereby energize the supplemental winding 122 from the AC power lines 102, 104. And if the determination made in block 604 is rather to not energize the supplemental winding 122, the switch 140 opens to thereby not energize the supplemental winding 122 from the AC power lines 102, 104. As noted above, the opening and closing of the switch can be carried out coincident with a current zero-crossing of the AC waveform to help mitigate RFI, EMI, voltage reflection, and other effects. As such, the controller may estimate the timing of upcoming current zero-crossings in the AC waveform, and time the control signals based on the estimated timings of upcoming zero-crossings.

In addition, as noted in connection with FIG. 4, the switch that is operated to selectively energize the supplemental winding in bock 606 may even be internal to the controller, which may output a regulated waveform to the supplemental winding.

Many functions described herein may be implemented in hardware, firmware, or software. Further, software descriptions of the disclosure can be used to produce hardware and/or firmware implementing the disclosed embodiments. According to some embodiments, software and/or firmware may be embodied on any known non-transitory computer-readable medium having embodied therein a computer program for storing data. In the context of this disclosure, computer-readable storage may be any tangible medium that can contain or store data for use by, or in connection with, an instruction execution system, apparatus, or device. For example, a non-volatile computer-readable medium may store software and/or firmware program logic executable by a processor to achieve one or more of the functions described herein in connection with FIGS. 1-6. Computer-readable storage may be, for example, an electronic, magnetic, optical, electromagnetic, infrared, or semiconductor system, apparatus, or device, or any suitable combination of the foregoing. More specific examples of computer-readable storage would include but are not limited to the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Further, although aspects of the present disclosure have been described herein in the context of a particular implementation in a particular environment for a particular purpose, those of ordinary skill in the art will recognize that its usefulness is not limited thereto and that the present disclosure can be beneficially implemented in any number of environments for any number of purposes.

In view of the exemplary systems described above, methodologies that may be implemented in accordance with the described subject matter will be better appreciated with reference to the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies described in this disclosure are capable of being stored on an article of manufacture to facilitate transporting and transferring such methodologies to computing devices.

Although some of various drawings illustrate a number of logical stages in a particular order, stages which are not order dependent can be reordered and other stages can be combined or broken out. Alternative orderings and groupings, whether described above or not, can be appropriate or obvious to those of ordinary skill in the art of computer science. Moreover, it should be recognized that the stages could be implemented in hardware, firmware, software or any combination thereof.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An electric motor comprising:
   a first conductive winding coupled to an AC source, and configured to generate a first magnetic field in response to being energized by the AC source;
   a second conductive winding configured to be selectively energized by the AC source via one or more switches, wherein the second conductive winding is arranged so as to generate a second magnetic field superimposed with the first magnetic field in response to being energized by the AC source;
   a rotor configured to magnetically interact with the first magnetic field, or the superimposed first magnetic field and second magnetic field, such that a torque is applied on the rotor; and
   a controller configured to: (i) obtain a measurement of a voltage of the AC source; (ii) make a determination, based on the obtained measurement, whether to energize the second conductive winding; and (iii) if the determination is made to energize the second conductive winding, cause the one or more switches to operate such that the second conductive winding is coupled to the AC source, or rather, if the determination is made to not energize the second conductive winding, cause the one or more switches to operate such that the second conductive winding is not coupled to the AC source.

2. The electric motor of claim 1, wherein the controller making the determination whether to energize the second conductive winding includes the controller either (i) determining that, given the obtained measurement of the voltage of the AC source, energizing the first conductive winding alone causes the electric motor to provide a target output power level, and, in response, making the determination to not energize the second conductive winding, or rather (ii) determining that, given the obtained measurement of the voltage of the AC source, energizing both the first conductive winding and the second conductive winding causes the electric motor to provide the target output power level, and, in response, making the determination to energize the second conductive winding.

3. The electric motor of claim 1, wherein the controller making the determination whether to energize the second conductive winding includes the controller: (i) comparing the obtained measurement of the voltage of the AC source with a threshold value; (ii) if the obtained measurement exceeds the threshold value, making the determination to not energize the second conductive winding; and (iii) if the obtained measurement does not exceed the threshold value, making the determination to energize the second conductive winding; and
   wherein the threshold value corresponds to a value of the voltage of the AC source at which the magnetic field generated by the first conductive winding alone causes the electric motor to provide a target output power level.

4. The electric motor of claim 1, wherein the controller is further configured to: (i) estimate a timing of a given current zero crossing of a periodic waveform of the AC source; and (ii) cause the one or more switches to couple the second conductive winding to the AC source, or decouple the second conductive windings from the AC source, coincident with the estimated timing of the given current zero crossing.

5. The electric motor of claim 1, wherein the controller is further configured to: obtain a series of measurements of the voltage of the AC source; and (ii) intermittently determine whether to energize the second conductive windings based on a most recent one of the series of measurements such that a total magnetic field that interacts with the rotor is adjusted over time, using one or both of the first conductive winding and the second conductive winding, to account for variations in the voltage of the AC source.

6. The electric motor of claim 1, wherein the controller making the determination includes the controller: (i) determining a target ratio between energized time, in which the second conductive winding is coupled to the AC source, and not energized time, in which the second conductive winding is not coupled to the AC source, wherein, given the obtained measurement of the voltage of the AC source, the determined target ratio causes the combination of the first conductive winding and the second conductive winding to generate a time-averaged superimposed magnetic field that interacts with the rotor to cause the motor to provide a target output power level; and (ii) at a given instant, determining whether to energize the second conductive winding so as to realize the determined target ratio.

7. The electric motor of claim 6, wherein the controller is further configured to update the target ratio based on a subsequently obtained measurement of the voltage of the AC source.

8. The electric motor of claim 6,
   wherein the controller is further configured to determine the target ratio such that the second conductive winding is periodically decoupled from the AC source during one or more contiguous half-cycles of a periodic waveform of the AC source; and
   wherein the controller is further configured to cause the one or more switches to repeatedly couple the second conductive winding to the AC source during a current zero-crossing of the periodic waveform, and decouple the second conductive winding from the AC source during another current zero-crossing of the periodic waveform, such that, over time, the second conductive winding is energized in accordance with the target ratio.

9. The electric motor of claim 1, wherein the first conductive winding is formed of a conductive wire having a first gauge and arranged with a first number of turns that generate a magnetic field so as to cause the motor to provide a target output power level, while the AC source supplies a first voltage; and
   wherein the second conductive winding is formed of a conductive wire having a second gauge and arranged with a second number of turns that generate a magnetic field, alone or in combination with additional windings, to supplement the magnetic field of the first winding so as to cause the motor to provide the target output power level, while the AC source supplies a second voltage less than the first voltage.

10. The electric motor of claim 9, wherein the first voltage corresponds to a nominally expected voltage supplied by an electricity distribution grid, and wherein the second voltage corresponds to a minimum expected voltage supplied by the electricity distribution grid.

11. The electric motor of claim 9, wherein the first number of turns and the second number of turns are equal.

12. The electric motor of claim 1,
   wherein the second conductive winding is one of multiple conductive windings configured to be selectively energized by the AC source via respective ones of the one or more switches, wherein each of the multiple conductive windings is arranged so as to generate a respective magnetic field superimposed with the first magnetic field in response to being energized by the AC source, and wherein the controller is further configured to, at a given instant, determine particular ones of the conductive windings to energize based on a most recent measurement of the voltage of the AC source, and cause the one or more switches to operate such that the determined particular ones of the conductive windings are coupled to the AC source and the others of the conductive windings are not coupled to the AC source.

13. The electric motor of claim 12, wherein the first winding and the multiple conductive windings are configured such that the respective magnetic fields generated by each are approximately equal in strength.

14. The electric motor of claim 1, further comprising:
a torque sensor configured to output feedback indicative of an amount of torque applied to the rotor by a load, and
wherein the controller is further configured to use the feedback from the torque sensor to make the determination whether to energize the second conductive winding.

15. A method of operating an electric motor having a first conductive winding configured to generate a first magnetic field in response to being energized by an AC source, a second conductive winding configured to generate a second magnetic field superimposed with the first magnetic field in response to being energized by the AC source, and a rotor configured to magnetically interact with the first magnetic field, or the superimposed first magnetic field and second magnetic field, such that a torque is applied on the rotor, the method comprising:

obtaining a measurement of a voltage of the AC source;
making a determination, based on the obtained measurement, whether to energize the second conductive winding; and
if the determination is made to energize the second conductive winding, causing one or more switches to couple the second winding to the AC source, or rather, if the determination is made to not energize the second conductive winding, causing the one or more switches to not couple the second conductive winding to the AC source.

16. The method of claim 15, further comprising:
wherein making the determination whether to energize the second conductive winding includes either (i) determining that, given the obtained measurement of the voltage of the AC source, energizing the first conductive winding alone causes the electric motor to provide a target output power level, and, in response, making the determination to not energize the second conductive winding, or rather (ii) determining that, given the obtained measurement of the voltage of the AC source, energizing both the first conductive winding and the second conductive winding causes the electric motor to provide the target output power level, and, in response, making the determination to energize the second conductive winding.

17. The method of claim 15,
wherein making the determination whether to energize the second conductive winding includes: (i) comparing the obtained measurement of the voltage of the AC source with a threshold value; (ii) if the obtained measurement exceeds the threshold value, making the determination to not energize the second conductive winding; and (iii) if the obtained measurement does not exceed the threshold value, making the determination to energize the second conductive winding; and
wherein the threshold value corresponds to a value of the voltage of the AC source at which the magnetic field generated by the first conductive winding alone causes the electric motor to provide a target output power level.

18. The method of claim 15, wherein making the determination includes:
determining a target ratio between energized time, in which the second conductive winding is coupled to the AC source, and not energized time, in which the second conductive winding is not coupled to the AC source, wherein, given the obtained measurement of the voltage of the AC source, the determined target ratio causes the combination of the first conductive winding and the second conductive winding to generate a time-averaged superimposed magnetic field that interacts with the rotor to cause the motor to provide a target output power level; and
at a given instant, determining whether to energize the second conductive winding so as to realize the determined target ratio.

19. The method of claim 15, further comprising:
obtaining a series of measurements of the voltage of the AC source; and
intermittently determining whether to energize the second conductive windings based on a most recent one of the series of measurements such that a total magnetic field that interacts with the rotor is adjusted over time, using one or both of the first conductive winding and the second conductive winding, to account for variations in the voltage of the AC source.

20. The method of claim 15, wherein the second conductive winding is one of multiple conductive windings configured to be selectively energized by the AC source via respective ones of the one or more switches, wherein each of the conductive windings is arranged so as to generate a respective magnetic field superimposed with the first magnetic field in response to being energized by the AC source, the method further comprising:
at a given instant, determining particular ones of the conductive windings to energize based on a most recent measurement of the voltage of the AC source;
causing the one or more switches to operate such that the determined particular ones of the conductive windings are coupled to the AC source and the others of the conductive windings are not coupled to the AC source.

* * * * *